(12) United States Patent
Imai et al.

(10) Patent No.: US 7,044,475 B2
(45) Date of Patent: May 16, 2006

(54) COVER-INTEGRATED GASKET

(75) Inventors: Yasushi Imai, Kanagawa (JP); Tadashi Utsunomiya, Kanagawa (JP); Tomohiro Ogata, Kanagawa (JP); Shosan Shibata, Kanagawa (JP); Tatsuhiko Hosokawa, Tokyo (JP); Naruhiko Mashita, Kanagawa (JP); Tsunehiro Yamamoto, Kanagawa (JP)

(73) Assignee: Bridgestone Corporation, Tokyo (JP)

( * ) Notice: Subject to any disclaimer, the term of this patent is extended or adjusted under 35 U.S.C. 154(b) by 211 days.

(21) Appl. No.: 10/470,541

(22) PCT Filed: Jan. 28, 2002

(86) PCT No.: PCT/JP02/00593

§ 371 (c)(1),
(2), (4) Date: Oct. 10, 2003

(87) PCT Pub. No.: WO02/061308

PCT Pub. Date: Aug. 8, 2002

(65) Prior Publication Data
US 2004/0099987 A1    May 27, 2004

(30) Foreign Application Priority Data
Jan. 31, 2001 (JP) ............... 2001-022870
May 16, 2001 (JP) ............... 2001-146287
May 16, 2001 (JP) ............... 2001-146289
May 23, 2001 (JP) ............... 2000-153443
Jun. 22, 2001 (JP) ............... 2001-189299

(51) Int. Cl.
*F16J 15/10* (2006.01)
*B29C 35/08* (2006.01)
*B29C 47/00* (2006.01)

(52) U.S. Cl. ............. 277/650; 264/477; 264/496; 264/177.1

(58) Field of Classification Search ........... 277/650; 264/472–477, 494, 496, 177.1, 171.23, 171.24
See application file for complete search history.

(56) References Cited

U.S. PATENT DOCUMENTS 4,093,692 A * 6/1978 Hill .................. 264/540

(Continued)

FOREIGN PATENT DOCUMENTS

DE    38 30 244 A1    3/1990

(Continued)

OTHER PUBLICATIONS

XP-002298638, Database WP1, Section Ch, Week 198810, Derwent Publications Ltd., London GB, with respect to JP 63 025005 A (Feb. 2, 1988) assigned to Mitsubishi Petrochemical Co., Ltd.

*Primary Examiner*—Alison K. Pickard
(74) *Attorney, Agent, or Firm*—Sughrue Mion, PLLC

(57) ABSTRACT

A gasket integrated with a cover wherein a gasket material composed of a thermoplastic elastomer composition is integrally fixed to the cover having a shape of multistep contraction over at least two contraction steps, a gasket wherein the cover and the gasket are integrally molded and after molding, are subjected to a heating treatment at a temperature not lower than the temperature at which an adhesive component in materials constituting the gasket initiates crystal fusion or glass transition, or a gasket wherein the cover and the gasket are integrally molded and a covering layer composed of a fluoropolymer is formed on the gasket surface on atmospheric side are proposed. According to the present invention, a gasket integrated with a cover for a hard disc device which gasket is excellent in adhesive property and productivity, and is minimized in permeability and penetration of substances is provided.

11 Claims, 3 Drawing Sheets

U.S. PATENT DOCUMENTS

| | | | |
|---|---|---|---|
| 5,147,691 A * | 9/1992 | Shimamoto et al. | 427/387 |
| 5,496,870 A * | 3/1996 | Chawla et al. | 522/90 |
| 5,830,947 A * | 11/1998 | Blong et al. | 525/187 |
| 5,945,463 A * | 8/1999 | Kawabuchi et al. | 522/96 |
| 6,114,449 A * | 9/2000 | Tojo et al. | 525/105 |
| 6,388,051 B1 * | 5/2002 | Jow et al. | 528/502 R |
| 6,505,839 B1 * | 1/2003 | Nishimuro et al. | 277/628 |
| 6,632,915 B1 * | 10/2003 | Schwarte et al. | 528/75 |
| 2005/0206093 A1 * | 9/2005 | Utsunomiya et al. | 277/628 |

FOREIGN PATENT DOCUMENTS

| | | |
|---|---|---|
| EP | 0 998 177 A2 | 5/2000 |
| JP | 48-51977 | 7/1973 |
| JP | 54072353 A | 6/1979 |
| JP | 60-110765 U | 7/1985 |
| JP | 04008788 A | 1/1992 |
| JP | 08034467 A | 2/1996 |
| JP | 08176394 A | 7/1996 |

* cited by examiner

COVER-INTEGRATED GASKET

TECHNICAL FIELD

The present invention relates to a gasket integrated with a cover and a process for producing a thermoplastic elastomer composition which is well suited for the gasket. More particularly, it is concerned with a gasket which is integrated with a cover and is suitable for compact size hard disc device and a process for producing a thermoplastic elastomer composition which is well suited for the gasket just mentioned.

BACKGROUND ART

In recent years, electronic equipment such as a computer has come to have intricate circuit constitution, accompanying the progress towards a supreme performance and miniaturization, and is prone to be readily damaged even by a slight amount of dust. Accordingly, dust prevention is increasingly required in practical application. Thus it is customary to put a gasket on a junction between a box type main body harboring the above-mentioned electronic equipment and a cover, and tighten them with fastening bolts or the like so as to hermetically integrate the main body and gasket. Further in order to simplify the handling at the time of application, there is widely used a gasket integrated with a cover in which the gasket and cover are integrated with each other.

In addition, in the case of a compact hard disc device having a disc size of 2.5 inches or smaller, it is customary to thin a cover material for making it lightweight and at the same time, make the cover into a multistep contraction shape for assuring the rigidity and the like.

Whether the cover is in the shape of multistep contraction or in a conventional shape instead of multistep contraction, the gasket is usually provided likewise.

Specifically, FIGS. 5 and 6 are each an end view showing a gasket integrated with a cover in which a gasket is installed on a cover of multistep contraction shape, as is the case with a cover of non-multistep contraction shape. In FIG. 5, a gasket 15 is fixed on the step 5a outside the cover 5 of multistep contraction shape. In FIG. 6, a gasket 16 is fixed on an outside step 6 at a position of an edge towards an inside step 6b, however, no gasket is fixed on the inside step 6b.

It has been proved, however, that installation of a gasket only on single step among multistage steps cannot assure sufficient adhesive endurance, sometimes causing gasket peeling apart partially or entirely.

In general, a gasket integrated with a cover is produced by a method which comprises injecting or extruding a material constituting a prospective gasket, usually a thermoplastic elastomer onto a prescribed position to form the gasket. However, it has been proved that the adherence between the gasket and the cover is not always sufficient, thus sometimes causing gasket peeling apart partially or entirely.

Owing to highly densified electronic parts items, needs for a gasket and sealing material that are more impermeable to dust and chemicals are steadily increasing.

On the other hand, a gasket for hard disc device (hereinafter, sometimes referred to as "HDD gasket") has hitherto been produced by (1) a method comprising sticking a punched urethane foam sheet or a solid rubber sheet to a cover plate; (2) a method comprising bridging solid rubber to both faces of a plate by means of transfer molding or injection molding to integrate the rubber with the plate; (3) a dispensing method comprising extruding a molten resin or resin in solution form into a gasket shape on a plate face through one stroke of drawing by the use of a dispenser to integrate the resin with the plate; a (4) method comprising injection molding a thermoplastic elastomer blended with an adhesive resin on a plate face to integrate the elastomer with the plate; or the like.

Among these methods, the dispensing method is advantageous in that (i) the lead-time until production is long and a mold with an expensive initial cost is unnecessary, and (ii) such step as sticking is unnecessary, since it is a method in which a resin is directly molded into a gasket shape on a cover plate. This dispensing method, which is industrially widely employed, is already applied to the production of gaskets for large-scale equipment such as 3.5 inches (88.9 mm) HDD. In fact, most of the 3.5 inches HDD gaskets are produced by the dispensing method.

On the other hand, accompanying the advanced miniaturization technology, 2.5 inches (63.5 mm) HDD is most prevailing at the present time, and miniature HDD of 1 inch (25.4 mm) has come to be commercially produced. The HDD gasket to be used for the miniature HDD is required to be a wall-like gasket having a narrow line width and a tall height.

Nevertheless, the gasket produced by the dispensing method, in which a gasket material extruded from a dispenser is formed into a gasket shape by one stroke of drawing, has such a cross sectional shape as distorted or oblate semicircle induced by the self weight of gasket material. Such being the case, the dispensing method brings about difficulties in producing a gasket having a narrow line width and a tall height and also in assuring accuracy or precision of the gasket. Accordingly the dispensing method, which is the most prevailing production process for 3.5 inches HDD gasket, is thought to be inapplicable to the production of 2.5 inches or smaller HDD gaskets. In fact, such a small HDD gasket produced by the dispensing method is not yet marketed.

On the other hand, a low hardness elastomer has heretofore been widely used as a gasket material for a hard disc device, and when used in the form of a gasket with a cover or a gasket with a frame by being integrated with a metallic cover or a metallic frame, has the advantage of sufficiently exhibiting its characteristics.

Moreover, a gasket for a hard disc device is required to be minimized in entrance of dust and in the bleed of low molecular weight components such as oils, because the bleed of such components gives rise to the disadvantage of a malfunction of a hard disc device.

DISCLOSURE OF THE INVENTION

Under such circumstances, it is an object of the present invention to provide a gasket which is integrated with a cover and which is well suited for a hard disc device, especially a compact size hard disc device, and is excellent in adherence and productivity.

It is another object of the present invention to provide a gasket which is integrated with a cover, and which is excellent in air tightness and hermetical sealing ability, minimized in permeability and penetration of substances, and is well suited for a hard disc device in particular.

It is still another object of the present invention to provide a process for producing a gasket for a hard disc device which process is capable of forming onto a cover body, a gasket having a narrow line width and a tall height and at the same time, a gasket which is produced by the above-mentioned process and is intended for a compact hard disc device.

It is a further object of the present invention to provide a process for producing a thermoplastic elastomer composition which is excellent in such performances required of a gasket material as low hardness and small compression set, minimized in the bleed of low molecular weight components and in oil bleed to an ink, and is well suited as a material constituting a gasket for a hard disc device and also as a material constituting the members for ink jet recording apparatus.

As a result of intensive extensive research and investigation made by the present inventors in order to overcome the above-mentioned problems, it has been found that the aforesaid objects can be achieved by the constitutions described hereunder. The present invention has been accomplished by such findings and information.

Specifically, the first aspect of the present invention provides a gasket integrated with a cover, wherein a gasket material composed of a thermoplastic elastomer composition is integrally fixed to the cover having a shape of multistep contraction over at least two contraction steps.

The second aspect of the present invention provides a gasket integrated with a cover, wherein the cover and the gasket are integrally molded and after molding, are subjected to a heating treatment at a temperature not lower than the temperature at which an adhesive component in materials constituting the gasket initiates crystal fusion or glass transition.

The third aspect of the present invention provides a gasket integrated with a cover, wherein the cover and the gasket are integrally molded, and a covering layer composed of a fluoropolymer is formed on the gasket surface on atmospheric side.

The fourth aspect of the present invention provides a process for producing a gasket integrated with a cover for use in a hard disc device which process comprises extruding a gasket material which is composed principally of an acryl-modified polyurethane and which is curable with activation energy rays onto a cover body through an extrusion port of a three dimensional automatic painting control apparatus and simultaneously therewith, irradiating the extruded gasket material with activation energy rays from an activation energy rays irradiation apparatus to cure the material, wherein said gasket material has a viscosity of 50 to 1,000 Pa·s at the temperature of extrusion and at the shear rate of 1.0/second, and when the relationship between (y) the common logarithm of viscosity and (x) the common logarithm of shear rate is expressed by y=−ax+b (both a and b are a positive number), the value of a is 0.3 or more. It also pertains to a gasket which is intended for a hard disc device and which is used in a hard disc device of smaller than 3.5 inches (88.9 mm) in size. The temperature of extrusion may be easily changed by varying the temperature of a cylinder in the extruder and is preferable to settling at from 20° C. to about 100° C. The temperature of extrusion lower than 20° C. requires a cooling means and the temperature of extrusion exceeding 100°C. causes difficulty in controlling the temperature of the leading end portion of the nozzle, etc., that are not easy to vary, because the difference of these temperature and the room temperature becomes large. Accordingly, the stability of the shape of the extruded article degrades.

The fifth aspect of the present invention provides to a process for producing a thermoplastic elastomer composition which process comprises dry blending (a') a hydrogenated block copolymer which is obtained by hydrogenating a block copolymer composed of three polymer blocks wherein the polymer blocks on both ends among the three are each a polymer block composed principally of a vinyl aromatic compound and the polymer block lying midway between the polymer blocks on both ends is a polymer block composed principally of a conjugated diene compound and which has a weight average molecular weight as measured by Gel Permeation Chromatograph (GPC) method being at least 250,000 in an amount of 100 parts by weight; (b') a non-aromatic softening agent for rubber having a kinematic viscosity of 300 to 500 mm$^2$/second at the temperature of 40° C. in an amount of 60 to 170 parts by weight; and (c') a crystalline polyolefin in an amount of 5 to 30 parts by weight, thereafter kneading the resultant blend; it also provides a gasket which is intended for a hard disc, and constitutes of the thermoplastic elastomer composition obtained by the above-mentioned process. Further, it provides to an ink tank which comprises an ink chamber filled in with the ink and an ink supply portion supplying a recording head portion with the ink and which is constituted of the above-mentioned thermoplastic elastomer composition.

THE MOST PREFERRED EMBODIMENT TO CARRY OUT THE INVENTION

In the following, more detailed description will be given of the present invention. In the first place, detailed description will be given of the gasket integrated with a cover according to the first aspect of the present invention with reference to FIGS. 1 through 4 comparing with FIGS. 5 and 6 within the scope of prior art.

Figure 1:
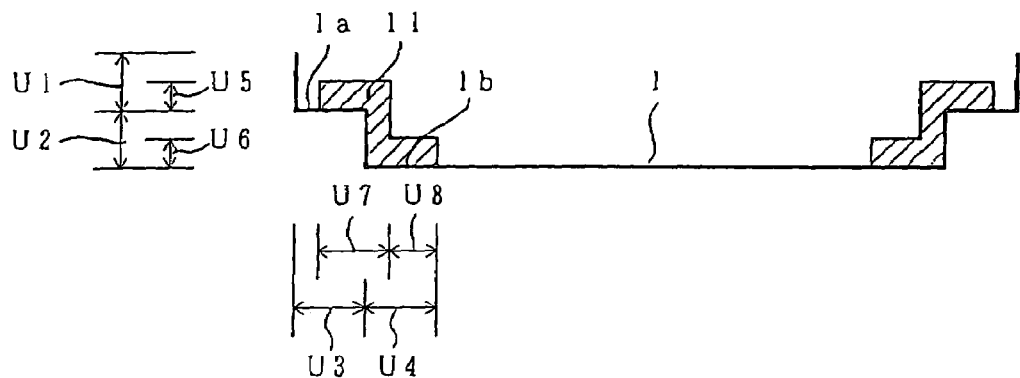
FIGS. 1 through 4 are each an end view showing one example of gasket integrated with a cover according to the first aspect of the present invention.
Figure 5:
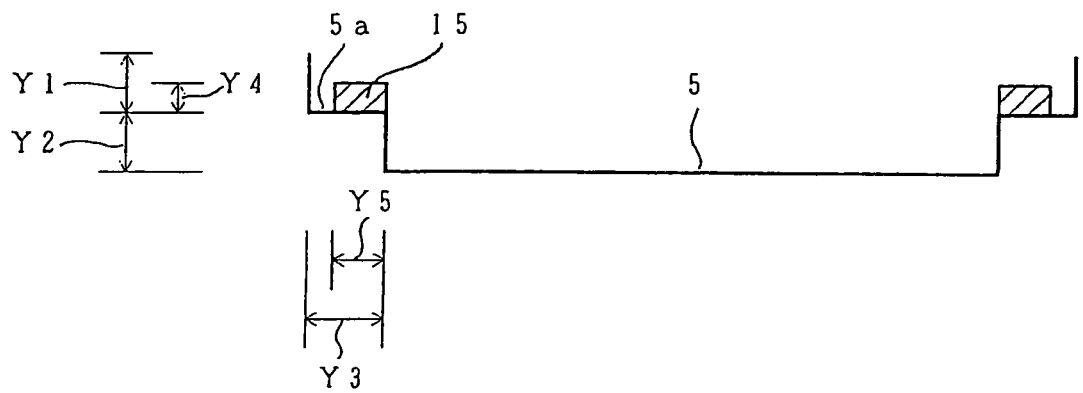
FIGS. 5 and 6 are each an end view showing one example of gasket integrated with a cover within the scope of prior art.
Figure 6:
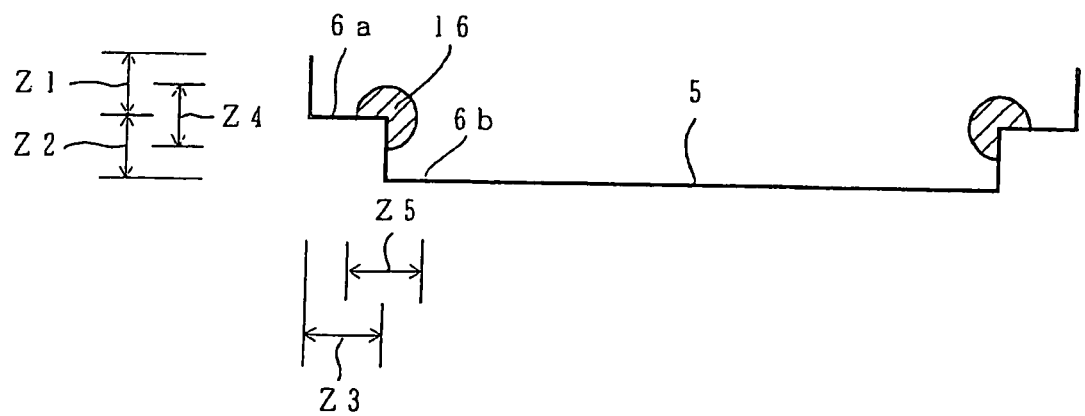

FIG. 1 is an end view showing one example of a gasket integrated with a cover in which the gasket is integrally installed to a cover in the shape of multistep contractions same as that shown on FIGS. 5 and 6, and a gasket material 11 composed of the thermoplastic elastomer composition is fixed to the cover 1 over the two contraction steps of 1a and 1b.

Figure 2:
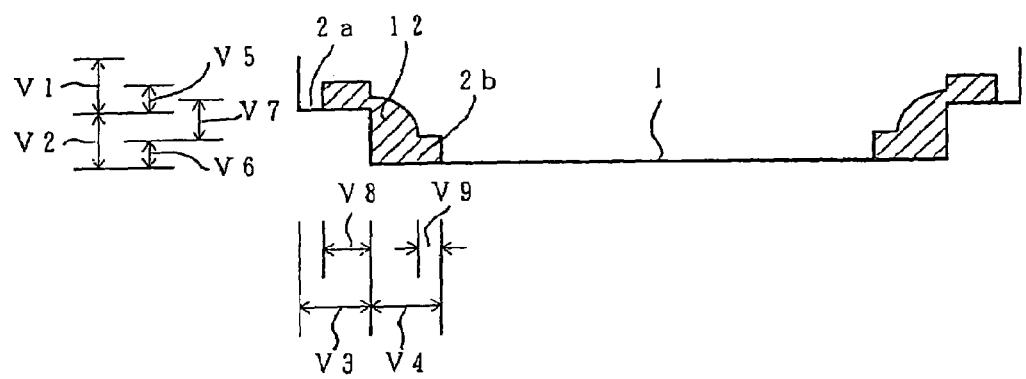

FIG. 2 is an end view showing one example of a gasket integrated with a cover in which the shape of the gasket is different from FIG. 1 as illustrate by a numerical symbol 12.

Figure 3:
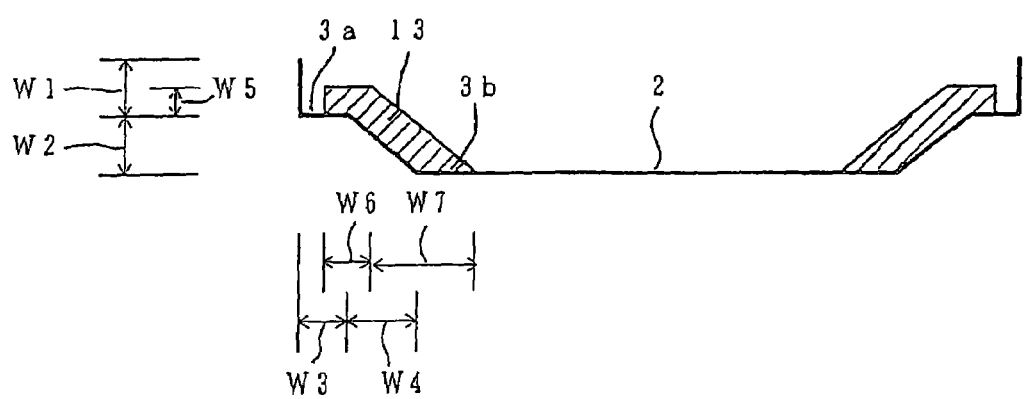

FIG. 3 is an end view showing one example of a gasket integrated with a cover in which the gasket is integrally installed to a cover in the shape of multistep contractions with a shape different from that shown on FIGS. 5 and 6, and a gasket material 13 composed of the thermoplastic elastomer composition is fixed to the cover 2 over the two contraction steps of 3a and 3b.

Figure 4:
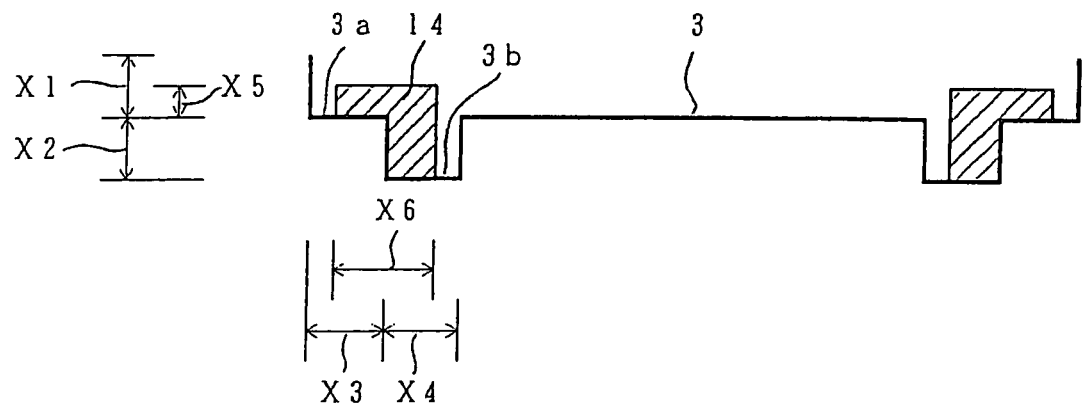

FIG. 4 is an end view showing one example of a gasket integrated with a cover in which the gasket is integrally installed to a cover in the shape of multistep contractions with a shape different from that shown on FIGS. 5 and 6, and a gasket material 14 composed of the thermoplastic elastomer composition is fixed to the cover 3 over the two contraction steps of 3a and 3b.

As described hereinbefore, in the gasket integrated with a cover according to the present invention, a gasket material composed of a thermoplastic elastomer composition is integrally fixed to the cover having a shape of multistep contraction over at least two contraction steps.

The second aspect of the present invention provides a gasket integrated with a cover, wherein the cover and the gasket are integrally molded and after molding, are subjected to a heating treatment at a temperature not lower than the temperature at which an adhesive component in materials constituting the gasket initiates crystal fusion or glass transition. The adhesive component is exemplified by modified polyolefinic resin and the like as the component (c) of the thermoplastic elastomer composition as described hereinafter.

In the third aspect of the present invention, previously well-known fluoropolymers are widely usable as the fluoropolymer constituting the covering layer formed on the gasket surface on atmospheric side. Preferably usable examples thereof include vinylidene fluoride/hexafluoropropylene base copolymer (e.g. "Biton A" available from Du pont Ltd., "Florel" available from Dinion Co., Ltd. and "Technoflon" available from Aujimond Co., Ltd.), vinylidene fluoride/hexafluoropropylene/tetrafluoroethylene base copolymer (e.g. "Biton B" available from Du pont Ltd., "Daiel" available from Daikin Industries, Ltd., "Florel" available from Dinion Co., Ltd. and "Technoflon" available from Aujimond Co., Ltd.), tetrafluoroethylene/propylene base copolymer (e.g. "Afuras" available from Asahi Glass Co., Ltd.), tetrafluoroethylene/propylene/vinylidene fluoride base copolymer (e.g. "Afuras" available from Asahi Glass Co., Ltd.), ethylene/tetrafluoroethylene/perfluoroalkyl vinyl ether base (e.g. "Biton ETP" available from Du pont Ltd.), etc. Typical examples thereof include a fluorothermoplastic elastomer which is a block copolymer of fluororubber (vinylidene fluoride/hexafluoropropylene/tetrafluoroethylene base copolymer) and a fluororesin (tetrafluoroethylene/ethylene alternating copolymer and polyvinylidene fluoride (e.g. "Daiel Thermoplastic" available from Daikin Industries, Ltd.). Of these, particularly preferable examples include tetrafluoroethylene/propylene base copolymer, vinylidene fluoride/hexafluoropropylene base copolymer or vinylidene fluoride/hexafluoropropylene/tetrafluoroethylene base copolymer.

In the aforesaid gasket integrated with a cover, the above-exemplified covering layer of the fluoropolymer is formed on the gasket surface on atmospheric side. By the term "surface on atmospheric side" is meant the gasket surface not be in direct contact with the cover plate.

A proper thickness of the covering layer is in the range of from 1 μm to 500 μm, particularly from 10 μm to 300 μm. The thickness thereof, when being smaller than 1 μm, brings about a fear of failure to assure sufficient effect upon preventing permeability and penetration of substances, whereas the thickness thereof, when being larger than 500 μm, leads to fear of unsuccessful in assuring enhanced effect meeting the increased thickness.

Previously well-known methods are adoptable to a method for forming the covering layer. Of these methods, a method which comprises coating the surface on atmospheric side or overall surfaces including the surface on atmospheric side of the gasket for the gasket integrated with a cover with a solution of a fluoropolymer in a solvent by spray coating, brush coating or the like, followed by drying the resultant coating is suitable.

As the material for the cover of the gasket integrated with a cover according to the first, the second and the third aspects of the present invention, a rigid resin is usable, but a metal is preferably usable from the aspect of workability and the like. Such metal may be properly optionally selected for use from among cold rolled steel sheets, galvanized steel sheets, aluminum/zinc alloy plated steel sheets, stainless steel sheets, aluminum sheets, aluminum alloy sheets, magnesium sheets and magnesium alloy sheets. Injection molded magnesium sheets are also usable. From the viewpoint of corrosion resistance, metallic sheets treated with non-electrolytic nickel plating are preferable. As a method for non-electrolytic nickel plating, there is usable any of well known methods that have heretofore been applied to metallic materials, for instance, a method which comprises immersing a metallic sheet to be treated in a non-electrolytic nickel plating bath comprising an aqueous solution at a pH of approximately 4.5 to 5.0 and at a temperature of approximately 85° C. to 95° C. which contains nickel sulfate, sodium hypochlorite, lactic acid, propionic acid and the like each in a proper proportion.

The thickness of the cover, which is properly optionally selected, is usually in the range of from 0.3 mm to 1.0 mm, preferably 0.4 mm to 0.6 mm.

As the materials which constitute the gasket for the gasket integrated with a cover according to the first, the second and the third aspects of the present invention, for instance, styrenic, olefinic, urethanic and ester-based thermoplastic elastomer compositions may be employed without specific limitation. With regard to the above-mentioned materials, an adhesive component such as acrylic acid and maleic anhydride is contained for the purpose of assuring adhesive property to the cover. The gasket integrated with a cover according to the present invention includes also the materials in which use in made of a material containing such adhesive component, and preferably blended with a material containing a modified polyolefinic resin as an adhesive component, for instance, a modified polyolefinic resin as such.

The present inventors have previously proposed a thermoplastic elastomer composition as a gasket material which has excellent rubber elasticity, favorable oil maintainability, low hardness, excellent seating properties and small compression set, said composition comprising (a) a hydrogenated block copolymer which is obtained by hydrogenating a block copolymer consisting essentially of three polymer blocks containing polymer blocks at both ends composed principally of a vinyl aromatic compound and an intermediate polymer blocks composed principally of a conjugated diene compound in an amount of 100 parts by weight; (b) a non-aromatic rubber-softening agent in an amount of 60 to 170 parts by weight; and (c) a modified polyolefin base resin in an amount of 5 to 30 parts by weight. The above-mentioned thermoplastic elastomer composition is preferably usable in the gasket integrated with a cover according to the present invention.

In the thermoplastic elastomer composition improved in adhesive property to metals, it is possible to obtain the hydrogenated block copolymer as the component (a) by hydrogenating, for instance, a block copolymer of polybutadiene and polystyrene, a block copolymer of polyisoprene and polystyrene, or a block copolymer of polybutadiene or ethylene/butadiene random copolymer and polystyrene. Of these, the hydrogenated block copolymer is preferable which is obtained by hydrogenating a block copolymer of styrene/butadiene/styrene, a block copolymer of styrene/isoprene/styrene or a block copolymer of styrene/ butadiene-isoprene/styrene. These are specifically exemplified by a diblock copolymer of crystalline polyethylene and polystyrene, a triblock copolymer of styrene-ethylene/butylene-styrene (SEBS), a triblock copolymer of styrene-ethylene/propylene-styrene (SEPS), a block copolymer of styrene-ethylene propylene/ethylenebutylene-styrene and the like. Of these, SEBS, SEPS or a block copolymer of styrene-ethylene propylene/ethylenebutylene-styrene is preferable.

The hydrogenated block copolymer has a weight average molecular weight of preferably at least 200,000, and a (non-crystalline) styrene block content of preferably in the range of from 20 to 40% by weight.

The (non-crystalline) styrene block segment has a glass transition temperature (Tg) of 60° C. or higher, preferably 80° C. or higher. The polymer at the portion connecting the non-crystalline styrene blocks at both ends is preferably non-crystalline as well, and is exemplified by a hydrogenated product of ethylenebutylene copolymer, butadiene polymer, isoprene polymer or the like, which may be in the form of a block copolymer or a random copolymer.

The hydrogenated block copolymer is used alone in many cases, but two or more thereof may be blended for use. It is possible to improve the fluidity upon molding by blending two or more copolymers each having a molecular weight and a styrene content that are different from one another. The hydrogenated block copolymer is readily selectable from the products such as Septon (trade name, available from Kuraray Co., Ltd.), Krayton G (trade name, available from Shell Chemical Co., Ltd.) and Tuftec (trade name, available from Asahi Chemical Industry Co., Ltd.) on the market.

In the above-mentioned thermoplastic elastomer composition having improved adhesive property to metals, the non-aromatic rubber-softening agent as the component (b) is blended for the purpose of lowering the hardness of the thermoplastic elastomer, and has a kinematic viscosity of preferably at least 300 $mm^2s^{-1}$, particularly preferably in the range of 300 to 10,000 $mm^2s^{-1}$ at the temperature of 40° C.

The softening agent having such properties may be properly optionally selected for use from a variety of non-aromatic rubber-softening agents, for instance, of mineral oil base, synthetic oil base, etc. The mineral oil base is exemplified by process oil base such as naphthene base and paraffin base.

Among these, one kind or more selected from mineral oil base paraffinic oil, naphthenic oil or synthetic oil base polyisobuthylenic oil each having a weight average molecular weight in the range of 450 to 5000 may be preferable.

Any of the above-exemplified softening agents may be used alone or in combination with at least one other in the form of mixture provided that they are compatible with one another.

The blending amount of the softening agent is 60 to 170 parts by weight based on 100 parts by weight of the aforesaid component (a), preferably 70 to 150 parts by weight based thereon more preferably 100 to 100 parts by weight based thereon. The blending amount thereof, when being less than 60 parts by weight, does not achieve sufficiently reduced hardness and causes a fear of insufficient flexibility of the thermoplastic material. When the blending amount exceeds 170 parts by weight, a liability to bleed of the softening agent arises and induces degradation of mechanical strength of the thermoplastic material. Preferably, the blending amount is properly optionally selected within the above-mentioned range in accordance with the molecular weight of the hydrogenated block copolymer as the component (a) and the types of other component to be incorporated therein.

Any of the softening agents is readily purchased as the products such as Diana Process Oil Series (trade name, available from Idemitsu Kosan Co., Ltd.), Sunbar Series and Sunsen Series (trade names, available from Nippon Oil Co., Ltd.), Lucant Series (trade name, available from Mitsui Chemicals Inc.) and the like on the market.

The above-mentioned modified polyolefinic resin as the component (c) in the thermoplastic elastomer composition according to the present invention is blended for the purpose of enhancing workability, heat resistant characteristics and adhesive property to a metal.

The polyolefinic resin to be modified is preferably a resin composed principally of polyethylene or polypropylene, and typical examples include isotactic polypropylene and a copolymer of propylene and a small amount of another α-olefin (e.g. propylene-ethylene copolymer and propylene/4-methyl-1-pentene copolymer). In the case of using isotactic polypropylene copolymer as a polyorefinic resin, the aforesaid copolymer having an MFR (measured in accordance with JIS K7210 at the temperature of 230° C. under a load of 2.16 kg) being at least 0.1 g/10 minutes, particularly at least 0.5 g/10 minutes is preferably employed.

The modified polyolefinic resin is formed by graft polymerizing or co-polymerizing such polyolefinic resin with an unsaturated carboxylic acid like maleic acid and maleic anhydride acid or with acryl acids or with polymerizable compound having hydroxyl group. Specific examples of the modified polyolefinic resin readily purchased as the products include Nuculele Series (trade name, available from Du pont-Mitsui Polychemicals Co., Ltd.), Youmex Series (trade name, available from Sanyo Chemical Industries Ltd.), Exceler Series (trade name, available from Exxon Chemical Japan Ltd.), Polybond Series (trade name, available from Uniroyal Co., Ltd.), Admer Series (trade name, available from Mitsui Chemicals Inc.) and the like on the market.

The modification rate (% by weight, parts by weight of a modifying agent to be used per 100 parts by weight of polypropylene) is preferably at least 1% by weight in order to assure sufficient adhesive property.

The blending amount of the component (c) is 5 to 30 parts by weight based on 100 parts by weight of the above-mentioned component (a), preferably 10 to 25 parts by weight based thereon. When the blending amount is less than 5 parts by weight, any sufficient adhesive property cannot be obtained. When the blending amount exceeds 30 parts by weight, the hardness of the thermoplastic material elevates unreasonably too high.

The hardness of the thermoplastic elastomer composition comprising (a), (b) and (c) component is preferably 50 degrees or less measured with the use of Type A durometer in accordance with JIS K6253.

The thermoplastic elastomer composition used in the present invention may be blended with a scaly inorganic filler such as clay, diatomaceous earth, talc, barium sulfate, calcium carbonate, magnesium carbonate, a metal oxide, mica, graphite and aluminum hydroxide; a granular or powdery filler in the form of solid such as various metallic powders, glass powder, ceramic powder and granular or powdery polymer; and other natural or artificial short fiber and long fiber such as glass fiber, metallic fiber and various polymer fibers.

Moreover, it is possible to contrive the weight saving of the resin composition according to the present invention by blending therein a hollow filler, for instance, an inorganic hollow filler such as glass balloon, an organic hollow filler such as polyvinylidene fluoride, etc. Further, it is possible to mix therein a variety of foaming agents to improve various physical properties such as weight saving thereof and also to mechanically mix therein a gas at the time of mixing.

In addition, it is possible to combinationally use at need as another additive, a flame retardant, antimicrobial agent, hindered amine base light stabilizer, ultraviolet absorber, anti-oxidant, coloring agent, cumarone resin, cumarone-indene resin, phenol-terpene resin, petroleum base hydrocarbon, various tackifiers such as rosin derivatives, various adhesive base elastomers such as Rheostomer (trade name, available from Riken Vinyl Industry Co., Ltd.), and other thermoplastic elastomer or resin such as Hibler, (trade name, available from Kuraray Chemical Co., Ltd.: block copolymer in which polystyrene blocks are bonded to both ends of vinyl-polyisoprene block) and Nolex (trade name, available from Nippon Zeon Co., Ltd.).

As an application example of the gasket integrated with a cover, the present inventors have discovered the following gasket for a hard disc device as the fourth aspect of the present invention. Specifically, it has been found that a highly viscous material can be accurately precisely extruded by using, as a gasket material, such material as having a high viscosity at a low shear rate and a low viscosity at a high shear rate through the control to a great extent, for the dependence of viscosity upon shear rate. More specifically, it has been found that a gasket with a tall shape despite its narrow line width is obtainable by using, as a gasket material, a material having characteristics such that the material is easy to extrude due to lowered viscosity under the condition that shear force is applied upon extrusion and conversely, the material is hard to extrude due to elevated viscosity under the condition that shear force is not applied after extrusion.

Further, the present inventors have succeeded in obtaining a gasket shape having a large ratio (h/w) of height (h) to line width (w) by one stroke of drawing through the use of an extrusion nozzle having a specific cross sectional shape such as the nozzle used for decorating confectionary in order to make the most of the viscosity characteristics of gasket materials. It becomes possible to exert the effect of this method for producing such gasket only by the use of the gasket having the viscosity characteristics mentioned above. In more detail a material with a low viscosity such as water, even if profile extrusion is possible, cannot reproduce the cross sectional shape of an extrusion port because of immediate deformation due to the weight of itself. Conversely, a material with a high viscosity, even if the cross sectional shape of an extrusion port can be reproduced, cannot be precisely extruded due to large extrusion resistance, when an extrusion port is of irregular shape.

In order to obtain a gasket having more precise dimensions and shape, it is necessary to cure the gasket material which has been extruded through the extrusion port of a nozzle as soon as possible in a state of non-contact. Thus the present inventors have succeeded in further enhancing the dimensional precision by installing beside the extrusion port, an activation energy irradiation unit for curing the extruded material and immediately curing the extruded material, while drawing a gasket shape on the cover body through one stroke of drawing. The fourth aspect of the present invention has been accomplished in the above-mentioned manner.

Specifically, the gasket material to be used herein is composed principally of an acryl-modified urethane, and has a viscosity of 50 to 1,000 Pa·s at the temperature of extrusion and at the shear rate of 1.0/second, and has the value a of 0.3 or more, when the relationship between (y) the common logarithm of viscosity and (x) the common logarithm of shear rate is expressed by $y=-ax+b$ (both a and b are each a positive number).

Examples of the acryl-modified urethane include urethane acrylate oligomer of polyether polyol, urethane acrylate oligomer of polyester polyol, urethane acrylate oligomer bearing both ether groups and ester groups in a molecule and urethane acrylate oligomer of carbonate diol bearing carbonate groups. Examples of the polyether polyol include a compound in which polyethylene glycol; polypropylene glycol; polytetramethylene glycol; polyhexamethylene glycol; 1,3-butylene glycol; 1,4-butylene glycol; 1,6-hexane diol, neopentyl glycol; cyclohexanedimethanol; 2,2-bis(4-hydroxycyclohexyl)propane; bisphenol A or the like subjected to addition reaction with ethylene oxide, propylene oxide or the like. The polyester polyol is obtainable by reacting an alcohol component with an acid component. Typical alcohol components include, for instance, a compound in which polyethylene glycol; polypropylene glycol; polytetramethylene glycol; 1,3-butylene glycol; 1,4-butylene glycol; 1,6-hexane diol, neopentyl glycol; 1,4-cyclohexanedimethanol; 2,2-bis(4-hydroxycyclohexyl)propane; bisphenol A or the like subjected to addition reaction with ethylene oxide, propylene oxide or ε-caprolactone. Typical examples of the acid component include a dibasic acid such as adipic acid, sebacic acid, azelaic acid and dodecanedicarboxylic acid and anhydrides thereof. A compound which is obtainable by simultaneously reacting the above-mentioned alcohol component, acid component and ε-caproluctone may be also employed as polyester polyol. The carbonate diol is obtainable by transesterification of a diaryl carbonate or a dialkyl carbonate with a diol or a reaction product of the diol and a dicarboxylic acid or a polyester diol which is a reaction product of the diol and ε-caprolactone or the like; the diaryl carbonate and dialkyl carbonate being exemplified by diphenyl carbonate, bis-chlorophenyl carbonate, dinaphthyl carbonate, phenyl-toluyl carbonate, phenyl-chlorophenyl carbonate, 2-tolyl-4-tolyl-carbonate, dimethyl carbonate and diethyl carbonate; the diol being exemplified by 1,6-hexane diol; neopentyl glycol; 1,4-butanediol; 1,8-octanediol; 1,4-cyclohexanedimethanol; 2-methylpropanediol; dipolypropylene glycol; and dibutylene glycol; the dicarboxylic acid being exemplified by oxalic acid, malonic acid, succinic acid, adipic acid, azelaic acid and hexahydrophthalic acid. The carbonate diol thus obtained is a monocarbonate diol bearing one carbonate structure in a molecule or polycarbonate diol bearing at least two carbonate structures in a molecule. With regard to the gasket materials to be used in the present invention, particularly preferable acryl-modified urethane includes acrylate oligomers of polyether polyol and urethane polyester polyol, and particularly preferable organic diisocyanate includes isophorone diisocyanate, 4,4'-dicyclohexylmethane diisocyanate and hexamethylene diisocyanate.

The gasket material to be used in the fourth aspect of the present invention may be blended with a well known photopolymerization initiator, which is exemplified by benzoin alkyl ethers such as benzoin ethyl ether; benzoin isobutyl ether and benzoin isopropyl ether, acetophenones such as 2,2-diethoxyacetophenone; and 4'-phenoxy-2,2-dichloroacetophenone, propiophenones such as 2-hydroxy-2-methylpropiophenone; 4'-isopropyl-2-hydroxy-2-methylpropiophenone; and 4'-dodecyl-2-hydroxy-2-methylpropiophenone, anthraquinones such as benzyldimethylketal; 1-hydroxycyclohexylphenyl ketone;

2-ethylanthraquinone; and 2-chloroanthraquinone, and thioxanthone based photopolymerization initiator. Any of these photopolymerization initiators may be used alone or in combination with at least one other. The blending amount of the photopolymerization initiator, if used, is in the range of preferably 0.5 to 5 parts by mass, more preferably 1 to 3 parts by mass based on 100 parts by mass of the acryl-modified urethane as the principal component.

The gasket material to be used in the fourth aspect of the present invention may be blended further with a photosensitizer, thermal polymerization inhibitor, curing accelerator, pigment and the like to the extent that the working effect of the present invention is not impaired thereby.

The gasket material to be used herein has a viscosity of 50 to 1,000 Pa·s, preferably 80 to 700 Pa·s at the temperature of 23° and at the shear rate of 1.0/second. The viscosity, when being lower than 50 Pa·s leads to incapability of preserving the gasket shape due to excessively high fluidity of the material, whereas the viscosity, when being higher than 1,000 Pa·s, brings about difficulty in imparting the gasket shape thereto. In addition, when the relationship between (y) the common logarithm of viscosity and (x) the common logarithm of shear rate is expressed by $y=-ax+b$ (both a and b are each a positive number), the value a needs to be 0.3 or more, preferably 0.35 or more, and more preferably 0.4 or more. The value a, when being less than 0.3, leads to such a disadvantages as incapability of preserving the gasket shape due to unreasonably low viscosity caused by small dependence of viscosity upon shear rate, or as incapability of extruding gasket material due to unreasonably high viscosity.

As the methods for regulating the viscosity of the gasket material and the dependence of viscosity upon shear rate within the above-mentioned range, there are available a method comprising controlling the molecular weight of a polymerization oligomer and a method comprising controlling the polarity thereof.

In the fourth aspect of the present invention, by using the gasket material having the aforesaid specific properties, it is made possible to obtain a gasket having a narrow line width and a tall height; for instance, the height thereof can be made to 0.5 to 1.0 mm, when the line width is set on 1.0 mm.

The cover body to be integrated with the gasket produced from the extruded and cured gasket material can be formed of a metal or a synthetic resin such as thermoplastic resin as is the case with the first, the second and the third aspects of the present invention. As the metal which forms the cover body, the same metals as those in the above-mentioned first, second and third aspects of the present invention may be employed. In particular from the viewpoint of corrosion resistance, a metal which is treated with non-electrolytic nickel plating, nickel plated aluminum and nickel plated steel may be preferably employed.

The thermoplastic resin constituting the cover body is exemplified by and properly optionally selected from styrenic resin such as acrylonitrile-styrene (AS) resin, acrylonitrile-butadiene-styrene (ABS) resin, polystyrene and syndiotactic polystyrene; olefinic resin such as polyethylene, poly-propylene, polypropylene complex including ethylene-propylene copolymer; polyamide resin such as nylon; polyester base resin such as polyethylene terephthalate and polybutylene terephthalate; modified polyphenylene ether; acrylic resin; polyacetal; polycarbonate; liquid crystal polymer and polyphenylene sulfide (PPS). The liquid crystal polymer is preferably a thermotropic liquid crystal polymer, which is specifically exemplified by polycarbonate base liquid crystal polymer, polyurethane base liquid crystal polymer, polyamide base liquid crystal polymer and polyester base liquid crystal polymer. Any of these resins may be used alone or in combination with at least one other.

In order to enhance the adhesive property between the cover body and gasket, it is preferable in advance, to subject the cover body to a surface treatment. The surface treatment is exemplified by plasma treatment and corona discharge treatment. For the plasma treatment, a plasma irradiator available from Keyence Inc. is usable.

With regard to the HDD gasket according to the present invention, the ratio (h/w) of gasket height (h) to line width (w) is preferably 0.5 or greater, more preferably greater than 0.5 in every portion of the gasket. The shape of the extrusion port is not specifically limited, and the use of semicircle shape enables the h/w to be 0.5. In the case where the h/w is made to be greater than 0.5, it is preferable that the face of the gasket material is brought into contact with the cover body, when the cross sectional shape of the extrusion port for a three dimensional automatic painting control apparatus is made into a quadrangle or triangle or semiellipse wherein the minor axis forms the straight line portion. In the case where the cross sectional shape of the extrusion port for a three dimensional automatic painting control apparatus is made into ellipse, it is preferable to make the gasket material to contact with the cover body by extruding it so that the minor axis of the ellipse parallel with the face of the cover; the gasket material is extruded through the straight line of the semiellipse or through one side from three or four sides as the base of the quadrangle or triangle; and the ratio $(h_0/w_0)$ of the height $(h_0)$ to base $(W_0)$ exceeds 0.5.

The quadrangle in the cross sectional shape of the extrusion port is preferably a square, rectangle or trapezoid. The face of the gasket material that is extruded through one of sides in the square, one of short sides in the rectangle or the long side between parallel edges in the trapezoid is brought into contact with the cover body. A triangle is preferably an isosceles triangle having a vertex angle of less than 90 degrees, and in this case, the face of the gasket material that is extruded through the base is brought into contact with the cover body.

In the present invention, the gasket material is extruded onto the cover body through the extrusion port, is simultaneously cured by activation energy rays irradiated from an activation energy rays irradiation unit, and is integrated with the cover body. In this unit, the activation energy rays are preferably controlled so as to be interlocked with the motion of extrusion port for the three dimensional automatic painting control apparatus.

In the present invention, the activation energy rays to be used for curing the gasket material means UV rays, ionizing radiation such as electron beam, α-rays, β-rays, γ-rays and the like. In the case of UV rays being used, the gasket material is preferably incorporated with a photopolymerization initiator and/or a photosinsitizer. In the case of ionizing radiation such as electron beam or γ-rays being used, it is possible to promptly proceed with curing without incorporating photopolymerization initiator or a photosinsitizer. UV rays source is exemplified by xenon lamp, low pressure mercury lamp, high pressure mercury lamp, ultrahigh pressure mercury lamp and the like. The atmosphere of UV rays irradiation is preferably an atmosphere of inert gas such as nitrogen gas and carbon dioxide gas or an atmosphere of diluted oxygen concentration, but a UV ray curable gasket material can be cured in an atmosphere of ordinary air. The temperature of the irradiation atmosphere can be set usually on 10 to 200° C.

Next, some description will be given of the fifth aspect of the present invention. Therein the items described hereunder come to be problems with an ink-jet apparatus in addition to the above-mentioned disadvantage such as malfunction of HDD due to entrance of air and bleeding.

An ink-jet recording apparatus has hitherto been equipped with an ink chamber in which ink is filled and an ink tank having an ink supply portion which supplies a recording head portion with the ink.

Such ink tank is required to be capable of favorably supplying ink meeting the quantity of ink discharged from a recording head on recording, and also to be free from ink leakage through a discharge port on nonrecording.

Example of the ink tank satisfying such requirement is an ink tank which comprises a recording head integrated therewith, a cartridge attachable to and detachable from the carriage and an absorbent (foam) filled therein.

However, the system wherein the absorbent is filled in entirely inside the tank involves such a problem that accompanying ink consumption, a negative pressure in the absorbent increases, thus remaining large quantity of the ink within the tank without being supplied to the recording head, whereby the consuming efficiency is deteriorated.

In order to overcome the above-mentioned problems, an ink cartridge for an ink-jet recording head constituted such that an ink tank is separated into an ink reservoir and a cavity by means of a partition wall with a through-hole placed at the bottom of the tank is proposed. An umbrella check valve is movably installed on the through-hole, the valve is opened at the timing when ink pressure in the recording head is lowered, and thus the ink in the reservoir is discharged into the cavity so that the ink is supplied to the recording head (Japanese Patent Application Laid-Open No. 231759/1987 (Showa 62)).

It is made possible thereby to increase the substantial ink-containing capacity due to no need of housing an absorbent in the cartridge, but in general an offset of an umbrella check valve is too large to accurately regulate ink supply to the recording head, and thus the ink supply rate is varied, thereby causing a serious problem of deteriorating printing quality.

In order to overcome the above-mentioned problem with the ink tank equipped with the umbrella check valve, an attempt is made to use an ink-tank valve which is set up at a position where an ink chamber is separated from an ink supply portion, moves by difference in pressure between the ink chamber and the ink supply portion, and supplies a recording head with the ink filled in the ink chamber {Japanese Patent Application Laid-Open No. 174860/1996 (Heisei 8)}. It is made possible by installing the ink-tank valve to surely respond a slight pressure difference from the recording head, maintain a negative pressure suitable for printing between the recording head and itself independently of ink swinging due to carriage movement, surely supply the recording head with the ink and further prevent the ink leakage due to temperature variation through an ink supply port and/or the recording head.

There is usually used in the ink-tank valve, an elastic material or, for instance, a plastic substrate to which an elastic material is adhesively bonded. As the elastic material, heat curable rubber has hitherto been generally used. However, heat curable rubber involves such problems that the rubber causes difficulty in dichroic injection molding together with plastics, an expensive cost for producing the ink-tank valve and besides, brings about difficulty in molding and vulcanizing into a member of desirable shape by using a material having lowered hardness.

On the other hand, installing a foamed elastic material such as polyurethane onto an ink supply port has heretofore prevented ink leakage from a replacement ink tank. Nevertheless, a long-term service sometimes leads to incapability of ink preservation. Such being the case, an elastic member excellent in durability has eagerly been desired.

In the case where a recording unit in an ink-jet recording apparatus is not actuated, the recording head is made to stand by at the end of the ink-jet recording apparatus body. Under a standby state, in order to prevent the ink from leaking through the recording head, which is housed on a sealing member arranged along a recessed portion placed on the recording apparatus body. Usually, heat curable rubber is used for the sealing member, but the problems same as the foregoing remain unsolved.

Further, accompanying steady tendency towards advanced performance of color ink-jet printers in recent yeas (printing performance of 360 dpi×360 dpi (dot/inch), multicolor printing, etc.), members for an ink-jet recording apparatus are required to be capable of correct printing of desirable colors, and excellent in durability in the ink composed of water, pigments and surfactants.

The fifth aspect of the present invention was made for the purpose of overcoming the above-mentioned problems.

In a process for producing a thermoplastic elastomer composition relating to the fifth aspect of the present invention, the component (a') hydrogenated block copolymer which is obtained by hydrogenating a block copolymer composed of three polymer blocks wherein the polymer blocks on both ends among the three are each a polymer block composed principally of a vinyl aromatic compound and the polymer block lying midway between those on both ends is a polymer block composed principally of a conjugated diene compound is employed.

The above-mentioned block copolymer is exemplified by styrene-butadiene-styrene block copolymer, styrene-isoprene-styrene block copolymer, etc. The hydrogenated block copolymer obtained by hydrogenating the block copolymer is exemplified by styrene-ethylene/butylene-styrene triblock copolymer (SEBS), styrene-ethylene/propylene-styrene triblock copolymer (SEPS), etc. Any of these hydrogenated block copolymers may be used alone or in combination with at least one other.

The hydrogenated block copolymer (a') necessarily has a weight average molecular weight as measured by Gel Permeation Chromatograph (GPC) method being at least 250,000. The weight average molecular weight, when being less than 250,000, causes a problem in regard to durability, when the thermoplastic elastomer composition according to the present invention is used as elastic members for an ink tank. The weight average molecular weight, which is not specifically limited in upper limit, is usually about 400,000. In the production process, the component (a') is preferably powdery.

The thermoplastic elastomer composition according to the present invention is blended with (b') a non-aromatic softening agent for rubber having a kinematic viscosity of 300 to 500 $mm^2$/second at the temperature of 40° C. for the purpose of lowering the hardness of the hydrogenated block copolymer. The kinematic viscosity at the temperature of 40° C. thereof, when being lower than 300 $mm^2$/second, causes such a disadvantage that oil bleed from the blend markedly increases, whereas the kinematic viscosity thereat, when being higher than 500 mm 2/second, brings about such a drawback of remarkable difficulty in dry blending. The softening agent has a weight average molecular weight of preferably less than 20,000, more preferably less than 10,000, particularly preferably less than 5000.

The softening agent in liquid form at room temperature or inherently in liquid form may be preferably employed. These may be employed whether it is hydrophilic or hydrophobic. The softening agent having such properties may be properly optionally selected from among softening agents of mineral oil base, synthetic oil base or the like for various resins or rubber which softening agents are used as the component (b) in the first, the second and the third aspects of the present invention. The blending amount thereof is similar to that in the first, the second and the third aspects of the present invention.

The crystalline polyolefin as the component (c') is exemplified by polyethylene, polypropylene, polyethylene-acrylic acid copolymer, maleic anhydride-modified polypropylene, etc. Of these, polypropylene is preferable in the purpose of use of gaskets and elastic members for ink-jet recording apparatus.

The blending amount of the crystalline polyolefin as the component (c') is 5 to 30, preferably 5 to 20, more preferably 10 to 15 each parts by weight based on 100 parts by weight of the hydrogenated block copolymer as the component (a'). The blending amount of polypropylene, when being less than 5 parts by weight based thereon, leads to such shortcoming as deteriorated extrusion molding properties or injection molding properties, whereas the amount, when being more than 30 parts by weight based thereon, results in such shortcoming that the hardness of the copolymer is unreasonably increased, whereby the flexibility thereof is impaired.

It is possible to blend when desired, polyphenylene ether resin in the thermoplastic elastomer composition relating to the present invention for the purpose of improving the compression set. The polyphenylene ether resin to be used here is a homopolymer composed of the repeating unit represented by the following general formula or a copolymer containing the aforesaid repeating unit:

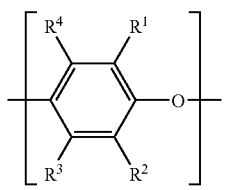

wherein $R^1$, $R^2$, $R^3$, $R^4$ are each independently of one another, a hydrogen atom, a halogen atom or a hydrocarbon group.

The polyphenylene ether may be selected for use from well-known ones, and is specifically exemplified by poly(2,6-dimethyl-1,4-phenylene ether), poly(2-methyl-6-ethyl-1,4-phenylene ether), poly(2,6-diphenyl-1,4-phenylene ether), poly(2-methyl-6-phenyl-1,4-phenylene ether) and poly(2,6-dichloro-1,4-phenylene ether). There is also usable polyphenylene ether copolymer such as the copolymer of 2,6-dimethylphenol and a monohydric phenol (e.g. 2,3,6-trimethylphenol and 2-methyl-6-butylphenol). Of these, poly(2,6-dimethyl-1,4-phenylene ether) and the copolymer of 2,6-dimethylphenol and 2,3,6-trimethylphenol are preferable, and poly(2,6-dimethyl-1,4-phenylene ether) is particularly preferable.

The blending amount of the polyphenylene ether resin can be preferably selected in the range of 10 to 250 parts by weight based on 100 parts by weight of the thermoplastic elastomer composition. The blending amount thereof, when being more than 250 parts by weight based thereon, unfavorably causes a fear that the hardness of the resultant thermoplastic elastomer composition is made unreasonably high, whereas the blending amount thereof, when being less than 10 parts by weight based thereon, unfavorably brings about insufficient effect on improving the compression set.

As is the case with the first, the second and the third aspects of the present invention, the thermoplastic elastomer composition may be blended with a granular or powdery filler in the form of solid such as granular or powdery polymer, other natural or artificial short fiber and long fiber, hollow filler, a variety of foaming agents and the like.

The thermoplastic elastomer composition may be blended with well-known additives such as resin components similar to those in the first, the second and the third aspects of the present invention in addition to the aforesaid components for the purpose of improving various characteristics of the composition.

As the resin components, for instance, polyolefinic resin other than crystalline polyolefin, polystyrenic resin and the like may be used alone or in combination with at least one other. It is possible by the addition thereof to contrive the improvement on workability and heat resistance of the thermoplastic material relating to the present invention. In the case where copolymer of isotactic polypropylene is used as a polyolefinic resin, there is preferably usable the copolymer having an MFR (JIS k7210) in the range of 0.1 to 50 g/10 minutes, particularly 0.5 to 30 g/10 minutes. The polystyrenic resin produced by any of radical polymerization process and ion polymerization process may be preferably employed provided that a well-known process produces it. The number average molecular weight of the polystyrenic resin is in the range of preferably 5000 to 500,000, more preferably 10,000 to 200,000. The molecular weight distribution {the ratio of weight average molecular weight to number average molecular weight $(M_w/M_n)$} is preferably up to 5.

The polystyrenic resin is exemplified by polystyrene, styrene-butadiene block copolymer bearing styrene moiety content of at least 60% by weight, rubber-reinforcing polystyrene, poly α-methylstyrene and poly-p-t-butylstyrene. Any of these may be used alone or in combination with at least one other. The copolymer that is obtained by polymerizing the mixture of monomers constituting the polymers may be also employed.

The above-mentioned polyolefinic resin may be used in combination with the polystyrenic resin. In the case where the aforesaid resin is added to the thermoplastic material relating to the present invention, the simultaneous use of the polyolefinic resin and polystyrenic resin causes the tendency to increase the hardness of the resultant material as compared with the single use of the polyolefinic resin. It is possible therefore, to regulate the hardness of the objective thermoplastic material by regulating the blending ratio of these resins. In this case, the ratio of polyolefinic resin to polystyrenic resin is preferably selected in the range of 95/5 to 5/95 (ratio by weight).

The above-mentioned resins, when used in combination, should be used to the extent that the working effect of the present invention is not impaired thereby. Thus the blending amount of any of these resins is preferably 0 to 100 parts by weight based on 100 parts by weight of the thermoplastic elastomer. The blending amount of the polyolefinic resin is more preferably 0.1 to 50 parts by weight based thereon. The blending amount of any of the resins, when being more than 100 parts by weight, unfavorably brings about unreasonably high hardness of the resultant thermoplastic material.

The process for producing the thermoplastic elastomer composition according to the fifth aspect of the present invention comprises dry blending the components (a'), (b') and (c'), and kneading the resultant blend. A method for uniformly mixing the components (a') and (b') is exemplified by a method comprising dry blending the components (a') and (b'), and allowing the resultant blend to leave for preferably 1 to 6 hours, more preferably 6 hours or longer.

The subsequent kneading can be easily conducted through melt kneading by means of a heating kneader such as a single screw extruder, a twin screw extruder, a roll, a Banbury mixer, a prabender, a kneader or a high shear type mixer, or by heat melt kneading the resultant mixture to which is further added as desired, a crosslinking agent such as an organic peroxide, crosslinking assistant or the like, or by heat melt kneading the mixture which is formed by simultaneously mixing the necessary components.

With regard to the process for producing the thermoplastic elastomer composition relating to the present invention, it is possible to crosslink the thermoplastic elastomer by adding a crosslinking agent such as an organic peroxide, a crosslinking assistant or the like.

The crosslinking agent which can be added for the purpose of partial crosslinking is exemplified by an organic peroxide, specifically by 2,5-dimethyl-2,5-di(t-butylperoxy)hexane; 2,5-dimethyl-2,5-di(benzoylperoxy)hexane; t-butylperoxybenzoate; dicumyl peroxide; t-butylcumyl peroxide; diisopropylbenzohydroperoxide; 1,3-bis-(t-butylperoxyisopropyl)benzene; benzoyl peroxide; and 1,1-di(t-butylperoxy)-3,3,5-trimetylcyclohexane. Useful crosslinking assistanct is exemplified by divinylbenzene, trimethylol propane triacrylate, ethylene dimethacrylate, diallyl phthalate, quinonedioxime, phenylenebismaleimide, polyethylene glycol dimethacrylate and an unsaturated silane compound. The above-cited organic peroxide and crosslinking assistant are arbitrarily used in an amount of 0.1 to 5 parts by weight based on 100 parts by weight of the whole blending materials to regulate the degree of crosslinking. Two or more of any of the organic peroxide and crosslinking assistant can be used in combination at need. In the case where an unsaturated silane compound is used, it is possible to proceed with crosslinking by bringing the same into contact with water in the presence of a silanol condensation catalyst.

The gasket for a hard disc according to the fifth aspect of the present invention can be produced by injection molding the above-mentioned thermoplastic elastomer composition onto, for instance, a metallic cover or metallic frame, thereby enabling to produce an integrated gasket in which the gasket is integrated with a cover body or frame body. The injection molding condition can be set on a mold temperature of 30° C. or higher, preferably from 50° C. to 100° C., a resin temperature of from 170° C. to 250° C., preferably from 180° C. to 230° C., an injection rate of 100 to $10^5$ sec$^{-1}$, preferably 1000 to $5 \times 10^4$ sec$^{-1}$.

The metal to be used for constituting the cover body or frame body may be the same as in the first, the second and the third aspects of the present invention.

The elastic material for the ink-jet recording apparatus according to the fifth aspect of the present invention is composed of the aforesaid thermoplastic elastomer composition.

The elastic material is not specifically limited provided that it is an assembly part requiring an elastic material, and is usable for any assembly part. It is particularly preferable to use the elastic material as an ink-tank valve which is set up at a position where an ink chamber is separated from an ink supply portion, which moves by difference in pressure between the ink chamber and the ink supply portion, and which supplies a recording head with the ink filled in the ink chamber or as a sealing member which is set up at an ink supply port of an ink tank and which prevents the ink from leaking through the ink supply port. The elastic material according to the fifth aspect of the present invention is used also in an ink-jet printer as members for the ink-jet printer and ink tank.

By using the thermoplastic elastomer composition comprising the components (a'), (b') and (c') for the aforesaid elastic members, the following working effects are exhibited.

The ink-tank valve as mentioned above is usually of such a structure that an elastic member is integrally formed on the surface of a plastic substrate. Thus an advantageous method for producing such a molded article is injection-molding method by dichroic molding method that is simple in production steps and reasonable in production cost. The heat curable rubber that has hitherto been used as the elastic member causes difficulty in conducting dichoric molding together with plastics. However, the use of the thermoplastic elastomer composition comprising the components (a'), (b') and (c') enables dichoric molding and the production of the ink-tank valve at a reasonable production cost.

In addition, the conventional heat curable rubber causes difficulty in molding and vulcanizing a material having a lowered hardness into a desirable member. However, the use of the thermoplastic elastomer composition comprising the components (a'), (b') and (c') overcomes the difficulty, and enables to obtain a molded article having moderate elasticity and excellent mechanical properties.

Moreover, in regard to the thermoplastic elastomer composition according to the fifth aspect of the present invention, it is possible to use a liquid such as paraffin base oil having a polarity greatly different from that of an ink as oil components to be used in lowering the hardness of hydrogenated block copolymer such as SEBS and SEPS of the components (a'). Further the oils are less liable to be compatible with styrene block that is the aggregation domain of the hydrogenated block copolymer such as SEBS and SEPS, thus exerting little influence on the physical properties such as strength of the hydrogenated block copolymer. Furthermore, the use of the hydrogenated block copolymer such as SEBS and SEPS can afford an ink-tank valve and a sealing member that are minimized in a change such as swelling due to a solvent such as ink and are excellent in durability, a sealing member preventing ink leakage through a recording head.

The sealing member is set up at an ink supply port and besides is usable for coupling portions connecting the ink supply portion and recording head.

The fifth aspect of the present invention also provides an elastic material constituted of the thermoplastic elastomer composition and particularly preferably, an ink-tank valve and/or an ink tank in which the sealing member is used.

The ink tank needs only to be composed of the elastic material without specific limitation, wherein ink may be held in foam such as polyurethane or wherein such foam may not be held in the tank.

The shapes of the ink-tank valve and the sealing member for the ink tank are not specifically limited, but are exem plified by the shapes of those which have hitherto been used for the ink tanks. With regard to methods for producing those, for instance, the sealing member for the ink tank, there can be adopted previously well known method such as injection molding and extrusion molding. In the case of the ink-tank valve, there can be adopted a dichroic molding method wherein plastics as the matrix are injection molded under melting inside a mold, subsequently the thermoplastic material relating to the present invention is injection molded under melting onto the plastics, so that the material is laminated and integrated with the surface of the molded plastics article, or an insert molding method wherein plastics as the matrix are injection molded under melting inside a mold, subsequently the resultant molded article is inserted in another mold, thereafter the thermoplastic material is injection molded under melting there onto, so that the material is laminated and integrated with the surface of the molded plastics article.

As described hereinbefore, the gasket integrated with a cover in the shape of multistep contraction according to the first and second aspects of the present invention is excellent in adhesive property and productivity, and is suitably usable for bard disc devices, particularly compact size hard disc devices.

The gasket integrated with a cover according to the third aspect of the present invention is excellent in hermetical sealing ability and air tightness, is minimized in permeability and penetration of substances and in particular, is well suited for hard disc devices.

According to the fourth aspect of the present invention, it is possible to produce the gasket in which the gasket with a tall height is integrated with a cover body and which is well suited for compact hard disc devices without using a mold or needing the step of sheet punching or adhering.

According to the fifth aspect of the present invention, it is possible to produce the thermoplastic elastomer composition which is excellent in the performances required of gaskets such as low hardness and small compression set, and is well suited as a material constituting gaskets due to minimized bleeding of small molecular weight components and as a material constituting members for ink-jet recording apparatus due to minimized bleeding to an ink.

In the following, the present invention will be described in more detail with reference to working examples, which however, shall never limit the present invention thereto.

EXAMPLES 1 TO 4 AND COMPARATIVE EXAMPLES 1 AND 2

A gasket integrated with a cover was prepared by installing a gasket by injection molding the thermoplastic elastomer composition, onto an aluminum-made square cover having a thickness of 0.2 mm in which four sides thereof were in the shape of multistep contraction and had each a length of 100 mm as illustrated on FIGS. 1 through 4 (corresponding to Examples 1 through 4, respectively) and on FIGS. 5 and 6 (corresponding to Comparative Examples 1 and 2, respectively).

An evaluation was made regarding the adhesive property between the cover and the gasket by a method comprising immersing the resultant gasket integrated with a cover in warm water at 70° C., subjecting the same to ultrasonic cleaning, and confirming the presence of peeling apart between the cover and the gasket.

The thermoplastic elastomer composition which was used in the Examples and Comparative Examples was that obtained by sufficiently kneading 100 parts by weight of SEPS (available from Kuraray Chemical Co., Ltd. under the trade name of "Septon 4077") having a styrene moiety content of 30% by weight, isoprene content of 70% by weight and a weight average molecular weight of 320,000); 150 parts by weight of paraffin base oil (available from Idemitsu Kosan Co., Ltd. under the trade name of "Diana Process Oil PW 380") having a kinematic viscosity of 380 $mm^2s^{-1}$ at the temperature of 40° C. and 25 parts by weight of ethylene-methacrylic acid copolymer (available from Mitsui DuPont Chemical Co., Ltd. under the trade name of "Nuclel AN 4312C"), and had a hardness being 30 degrees as measured in accordance with JIS K6253 with a durometer of type A and a compression set being 30% as measured in accordance with JIS K6262 after being allowed to leave under a compression ratio of 25% at the temperature of 70° C. for 22 hours.

The dimension of each of the portions was as follows (symbols indicate those in the drawings):

FIG. 1 (Example 1) . . . U1: 5 mm, U2: 3 mm, U3: 5 mm, U4: 3 mm, U5: 2 mm, U6: 1 mm, U7: 3 mm, U8: 2 mm.

FIG. 2 (Example 2) . . . V1: 5 mm, V2: 3 mm, V3: 5 mm, V4: 3 mm, V5: 2 mm, V6: 1 mm, V7: 3 mm, V8: 2 mm, V9: 2 mm.

FIG. 3 (Example 3) . . . W1: 5 mm, W2: 3 mm, W3: 3 mm, W4: 5 mm, W5: 2 mm, W6: 3 mm, W7: 5 mm.

FIG. 4 (Example 4) . . . X1: 5 mm, X2: 3 mm, X3: 3 mm.

FIG. 5 (Comparative Example 1) . . . Y1: 5 mm, Y2: 3 mm, Y3: 3 mm, Y4: 1 mm, Y5: 2 mm.

FIG. 6 (Comparative Example 2) . . . Z1: 5 mm, Z2: 3 mm, Z3: 3 mm, Z4: 2 mm, Z5: 2 mm.

TABLE 1

|  | Examples | | | | Comparative Examples | |
| --- | --- | --- | --- | --- | --- | --- |
|  | 1 | 2 | 3 | 4 | 1 | 2 |
| Shape | FIG. 1 | FIG. 2 | FIG. 3 | FIG. 4 | FIG. 5 | FIG. 6 |
| Adhesion endurance | not peeled apart | | | | partially peeled apart | entirely peeled apart |

EXAMPLES 5 TO 7 AND COMPARATIVE EXAMPLES 3 TO 5

A gasket with a cover was prepared by installing a gasket onto an aluminum-made square cover having a thickness of 0.3 mm in which four sides thereof had each a length of 100 mm by injection molding the thermoplastic elastomer the chemical composition and blending proportion of which are given on Table 2 at an injection temperature of 200° C. and an injection cycle of 20 seconds to form a square gasket portion measuring 1 mm in width, 1 mm in height and 50 mm in each side length. Thereafter, the resultant gasket was allowed to leave for 5 minutes in the atmosphere of heat treatment temperature as described on Table 2.

An evaluation was made of the adhesive property between the cover and the gasket by a method comprising immersing the resultant gasket integrated with a cover in warm water at 70° C., subjecting the same to ultrasonic cleaning, and confirming the presence of peeling apart between the cover and the gasket. The results are given on Table 2.

TABLE 2

|  | Examples | | | Comparative Examples | | |
| --- | --- | --- | --- | --- | --- | --- |
|  | 5 | 6 | 7 | 3 | 4 | 5 |
| Blended Material (parts by weight) | | | | | | |
| (a) | 100 | 100 | 100 | 100 | 100 | 100 |
| (b) | 150 | 150 | 150 | 150 | 150 | 150 |
| (c)-1 | 25 |  |  | 25 |  |  |
| (c)-2 |  | 25 |  |  | 25 |  |
| (c)-3 |  |  | 25 |  |  | 25 |
| Hardness of material JIS-A (degree) | 20 | 20 | 15 | 20 | 20 | 15 |
| Initiation temperature (° C.) | *70 | *100 | **70 | *70 | *100 | **70 |
| Heat treatment temperature (° C.) | 100 | 120 | 100 | 50 | 50 | 50 |
| Evaluation of adhesion | not peeled apart | not peeled apart | not peeled apart | partially peeled apart | partially peeled apart | entirely peeled apart |

[Remarks]
*Initiation temperature of crystal fusion,
**Initiation temperature of glass transition,
Material (a): SEPS (available from Kuraray Chemical Co., Ltd. under the trade name of "Septon 4077") having a styrene moiety content of 30% by weight, isoprene content of 70% by weight, number average molecular weight of 260,000, weight average molecular weight of 20,000, molecular weight distribution of 1.23 and hydrogenation rate of at least 90%.
Material (b): paraffin base oil (available from Idemitsu Kosan Co., Ltd. under the trade name of "Diana Process Oil PW 380") having a kinematic viscosity of 380 mm$^2$s$^{-1}$ at the temperature of at 40° C.
Material (c)-1: methacrylic acid-modified polyethylenic copolymer (available from Mitsui DuPont Chemical Ltd. under the trade name of "Nuclel AN 4312C").
Material (c)-2: maleic anhydride-modified polypropylenic copolymer (available from Sanyo Chemical Industries Co., Ltd. under the trade name of "Yeomex 1001").
Material (c)-3: maleic anhydride-modified SEBS (available from Asahi Chemical Industries Co., Ltd. under the trade name of "Tuftec M1943").

EXAMPLE 8 AND COMPARATIVE EXAMPLE 6

The thermoplastic elastomer composition was obtained by sufficiently kneading 100 parts by weight of SEPS (available from Kuraray Chemical Co., Ltd. under the trade name of "Septon 4077") having a styrene moiety content of 30% by weight, isoprene content of 70% by weight and a weight average molecular weight of 320,000); 150 parts by weight of paraffin base oil (available from Idemitsu Kosan Co., Ltd. under the trade name of "Diana Process Oil PW 380") having a kinematic viscosity of 380 mm$^2$s$^{-1}$ at the temperature of 40° C. and 25 parts by weight of ethylene-methacrylic acid copolymer (available from Mitsui DuPont Chemical Co., Ltd. under the trade name of "Nuclel AN 4312C"). A 100 μm thick covering layer consisting of tetrafluoroethylene/propylene copolymer (available from by Asahi Glass Co., Ltd. under the trade name of "Afras") was formed on a sheet which was obtained from the above-prepared thermoplastic elastomer composition and which had a hardness being 30 degrees as measured in accordance with JIS K6253 using a durometer of type A (Example 8). Subsequently, a measurement was made of the dimethylcyclohexane permeability for the sheet with the covering layer. As the result, the permeability of the sheet in Example 8 was 50 when the permeability for a sheet without a covering layer was set on 100 (Comparative Example 6).

The covering layer was formed by applying coating of a 1% solution of fluoropolymer (tetrafluoroethylene/propylene copolymer) in butyl acetate with a brush, and drying the coating at room temperature.

Figure 7:
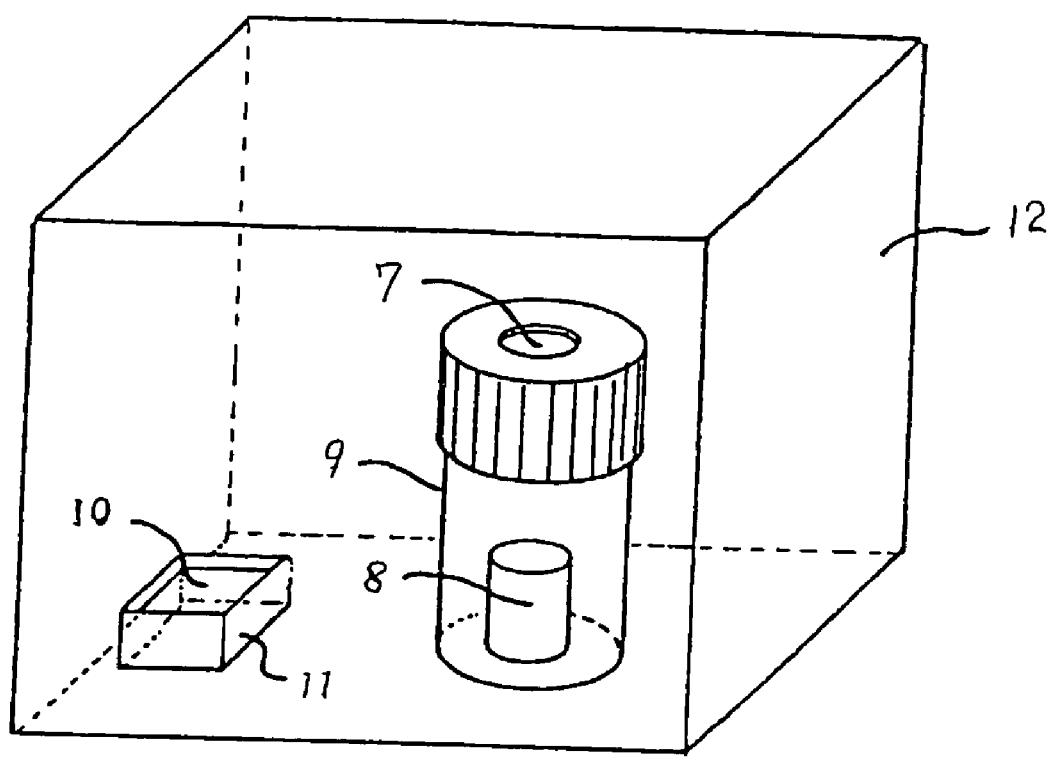
FIG. 7 is a schematic view showing a method for investigating permeability of dimethylsiloxane as used in Example 8.

The dimethylcyclohexane permeability was measured as illustrated on FIG. 7, by placing, in a glass container 12 in a state of being hermetically sealed, a vial 9 which was equipped on its lid with a gasket consisting of the above-mentioned sheet with or without the covering layer, and in which TENAX adsorbent 8 (trade name, available from Buchem BV Corp) was enclosed along with an open vessel 11 containing dimethylcyclohexane 10, allowing the vial 9 and vessel 11 to leave therein at the temperature of 60° C. for 12 hours and thereafter determining the amount of dimethylcyclohexane adsorbed on the TENAX adsorbent by means of a thermal analysis method.

EXAMPLES 9 THROUGH 17

An ultraviolet ray crosslinkable type polyurethane containing acryl-modified polyurethane "Ecllipse" available from Eementis Specialties Co., Ltd. USA was used as the gasket material. The ultraviolet ray crosslinkable type polyurethane had a viscosity of 620 Pa·s at the temperature of 23° C. and the shear rate of 1.0/second and a relationship between (y) the common logarithm of viscosity [Pa·s] and (x) the common logarithm of shear rate [s$^{-1}$] being y=−0.456x+2.74.

"CENTURY C720" produced by NORDSON Corp (hereinafter referred to as "Apparatus 1") or a liquid painting "robot 350-3" produced by Scientic Corp (hereinafter referred to as "Apparatus 2" was used as the three dimensional automatic painting control apparatus. NOVACURE ultraviolet ray irradiation unit produced by EFOS Corp was used as the ultraviolet ray irradiation unit.

By the use of each of extrusion ports as given on Table 3, the gasket material was extruded from the Apparatus 1 or Apparatus 2 onto an aluminum-made 0.3 mm thick cover body measuring 100 mm by 70 mm in size, irradiating the gasket material with ultraviolet rays to prepare each of the gasket in such shape as given on Table 3. The geometrical cross sectional shape of each of the gasket thus obtained was identical with the shape of the extrusion port through which the material was extruded. However, in the case where the shape of the extrusion port through which the material was extruded was an ellipse, the geometrical cross sectional shape of the gasket obtained in Example 10 was an incomplete ellipse because the portion where it contacted with a cover was thin.

Additionally, the measurement of the viscosity about the materials in the foregoing Examples and the following Examples or Comparative Examples was conducted in accordance of the following method:

A shear rate is measured by means of "Rheo Stress R150" produced by HAAKE Inc. rotating the material among parallel discs with diameters of 20 ram and having a distance of 0.2 mm between them at a predetermined temperature and under a predetermined shear stress. The viscosity is determined as a Quotient obtained by dividing the value of the measured shear stress by the value of the predetermined shear rate.

TABLE 3 - 1

| | Three dimensional automatic painting control apparatus | Cross sectional shape of extrusion port |
|---|---|---|
| Example 9 | Apparatus 1 | semicircle with diameter of 1.0 mm |
| Example 10 | Apparatus 1 | ellipse or semiellipse with major/minor axis lengths of 1.0 mm/0.8 mm (strait line: minor axis) |
| Example 11 | Apparatus 1 | semiellipse with major/minor axis lengths of 1.6 mm/0.5 mm (strait line: minor axis) |
| Example 12 | Apparatus 1 | square with each side length of 1.0 mm |
| Example 13 | Apparatus 2 | rectangle with long/short side length of 1.2 mm/0.8 mm |
| Example 14 | Apparatus 2 | rectangle with long/short side length of 1.1 mm/0.9 mm |
| Example 15 | Apparatus 2 | rectangle with long/short side length of 1.1 mm/0.9 mm |
| Example 16 | Apparatus 2 | equilateral triangle with each side length of 1.0 mm |
| Example 17 | Apparatus 2 | triangle with base length of 1.1 mm, height of 0.7 mm |

TABLE 3 - 2

| | Shape of Gasket | | | |
|---|---|---|---|---|
| | Cross sectional shape | Height (h) (mm) | Line Width (w) (mm) | h/w |
| Example 9 | semicircle | 0.5 | 1.0 | 0.5 |
| Example 10 | incomplete ellipse | 0.8 | 0.8 | 1 |
| | semiellipse | 0.5 | 0.8 | 0.63 |
| Example 11 | semiellipse | 0.8 | 0.5 | 1.6 |
| Example 12 | square | 1 | 1 | 1 |
| Example 13 | rectangle | 1.2 | 0.8 | 1.5 |
| Example 14 | rectangle | 1.1 | 0.9 | 1.22 |
| Example 15 | rectangle | 0.9 | 1.1 | 0.82 |
| Example 16 | equilateral triangle | 0.87 | 1 | 0.87 |
| Example 17 | triangle | 0.7 | 1.1 | 0.64 |

COMPARATIVE EXAMPLES 7 THROUGH 15

A photocurable acrylic resin which had a viscosity of 300 Pas at the temperature of 23° C. and at the shear rate of 1.0/second and a relationship between (y) the common logarithm of viscosity and (x) the common logarithm of shear rate being y=−0.10x+2.58 was used as the gasket material. Gaskets were prepared by the use of the extrusion port having the same shape as in Examples 9 to 17 and in the same manner as in Examples 9 to 17. Any of the gaskets thus prepared was of distorted or oblate shape without reproducing the shape of the extrusion port.

In the following Examples and Comparative Examples, evaluations of physical properties were carried out by the methods described hereunder.

(1) Hardness of composition: in accordance with JIS K 6253 (type A)

(2) Compression set: in accordance with JIS K 6262

(3) Bleed rate of softening agent

A sample measuring 25 mm in diameter and 2 mm in thickness was put between steel sheets, compressed to 1 mm thickness, allowed to leave at the temperature of 70° C. for 48 hours and then weighed. The value obtained by subtracting the weight of the sample after compression from the weight thereof before compression was regarded as bleed rate of softening agent and expressed by percentage (%). The bleed rate of the softening agent, when being less than 3%, is regarded as marketable, and a supreme performance product needs to have a bleed rate of up to 1%.

(4) Extrudability of Thermoplastic Elastomer Composition

When each of the blends was continuously extruded for 1 hour through a twin-screw extruder (produced by Toyo Seiki Co., Ltd. with L/D of 25), comparison was made of the number of strand cutoff times during 1-hour extrusion.

Measurements were made of weight average molecular weight of the copolymer by means of Gel Permeation Chromatography (GPC) (produced by Tosoh Corporation under the trade name of "GMH-XI" (two trains in series)}. The value was expressed in terms of polystyrene based on monodispersed polystyrene by using differential refractive index (RI).

EXAMPLES 18 TO 26 AND COMPARATIVE EXAMPLES 16 AND 17

Each of the components having a blending proportion as given on Table 4 was dry blended at room temperature with a Henschel mixer, allowed to leave for a period of time (hours) as given on Table 4 and thereafter kneaded with a twin-screw kneading extruder in Examples 18 through 26, while in Comparative Examples 16 and 17, paraffin base oil was fed by side feed system in the course of kneading with the twin-screw kneading extruder. The thermoplastic elastomer composition, which was prepared in this manner, was sampled to evaluate physical properties.

As a result as is clearly seen from Table 4, the oil bleed was suppressed to less than 3% in the compositions of Examples 18 through 26, while in the compositions of Comparative Examples 16 and 17, the oil bleed took place by 3% or more.

TABLE 4-1

| | Example | | | | |
|---|---|---|---|---|---|
| BLENDING COMPONENT | 18 | 19 | 20 | 21 | 22 |
| BLENDING PROPORTION (parts by weight) | | | | | |
| a-1 | 100 | | | | |
| a-2 | | 100 | | | |
| a-3 | | | 100 | | |
| a-4 | | | | 100 | |
| a-5 | | | | | 100 |
| b-1 | 150 | 150 | 150 | 150 | 100 |
| c-1 | 12.5 | 12.5 | 12.5 | 12.5 | 12.5 |
| Time for leaving after dry blend (hours) | 12 | 12 | 12 | 12 | 12 |
| EVALUATION | | | | | |
| Hardness (JIS-A) (degree) | 20 | 20 | 20 | 20 | 25 |
| Compression set (%) | 25 | 35 | 35 | 35 | 35 |
| Bleed rate of softening agent (%) | up to 1 | up to 1 | up to 1 | up to 1 | up to 1 |
| Extrudability (times/hour) | up to 3 | up to 3 | up to 3 | up to 3 | up to 3 |

TABLE 4-2

| BLENDING COMPONENT | Example | | | | Comparative Example | |
|---|---|---|---|---|---|---|
| | 23 | 24 | 25 | 26 | 16 | 17 |
| BLENDING PROPORTION (parts by weight) | | | | | | |
| a-1 | 100 | | 100 | | 100 | |
| a-2 | | 100 | | 100 | | 100 |
| a-3 | | | | | | |
| a-4 | | | | | | |
| a-5 | | | | | | |
| b-1 | 70 | 70 | 150 | 150 | 150 | 150 |
| c-1 | 12.5 | 12.5 | 12.5 | 12.5 | 12.5 | 12.5 |
| Time for lieving after dry blend (hours) | 12 | 12 | 0.5 | 0.1 | | |
| EVALUATION | | | | | | |
| Hardness (JIS-A) (degree) | 45 | 45 | 20 | 20 | 20 | 20 |
| Compression set (%) | 35 | 40 | 25 | 35 | 25 | 35 |
| Bleed rate of softening agent (%) | up to 1 | up to 1 | 2.5 | 2.5 | 3 or more | 3 or more |
| Extrudability (times/hour) | up to 3 | up to 3 | up to 5 | up to 5 | 10 or more | 10 or more |

{Description of Blending Components}

Component (a)

a-1: "Septon 4077" available from Kuraray Co., Ltd. (SEPS, weight average molecular weight of 350,000, styrene moiety content of 30% by weight)

a-2: "Septon 4055" available from Kuraray Co., Ltd. (SEPS, weight average molecular weight of 290,000, styrene moiety content of 30% by weight)

a-3: "Septon 8006" available from by Kuraray Co., Ltd. (SEPS, weight-average molecular weight of 290,000, styrene moiety content of 30% by weight)

a-4: "Crayton G" available from Shell Chemicals Co., Ltd. (SEBS, weight-average molecular weight of 300,000, styrene moiety content of 30% by weight)

a-5: "Tuftec H1272" available from Asahi Chemical Industries Co., Ltd. (SEBS, weight-average molecular weight of 300,000, styrene moiety content of 30% by weight)

Component (b)

b-1: "Diana Process Oil PW 380" available from Idemitsu Kosan Co., Ltd. (paraffin base oil having a kinematic viscosity of 380 mm$^2$s$^{-1}$ at the temperature of 40° C. and having weight-average molecular weight of 750)

Component (c)

c-1: "PP-BC05B" available from Japan Polychem Co., Ltd. (non-modified polypropylene)

INDUSTRIAL APPLICABILITY

The present invention relates to a gasket integrated with a cover and a process for producing a thermoplastic elastomer composition to be used for the gasket. The gasket integrated with a cover is suitably employed for compact size hard disc devices. The thermoplastic elastomer composition produced by the process is suitably employed for materials that constitute a gasket for hard disc devices and besides, members for ink-jet recording apparatus.

What is claimed is:

1. A process for producing a gasket integrated with a cover for use in a hard disc drive device which process comprises extruding a gasket material which is composed principally of an acryl-modified polyurethane and which is curable with activation energy rays onto a cover body through an extrusion port of a three dimensional automatic painting control apparatus and simultaneously therewith, irradiating the extruded gasket material with activation energy rays from an activation energy rays irradiation apparatus to cure the material, wherein said gasket material has a viscosity of 50 to 10,000 Pa·s at the temperature of 23° C. and at the shear rate of 1.0/second, and has the value a of 0.3 or more, when the relationship between (y) the common logarithm of viscosity [Pa·s] and (x) the common logarithm of shear rate [s$^{-1}$] is expressed by y=−ax+b (both a and b are each a positive number).

2. The process according to claim 1, wherein the cross section shape of the gasket is such that the ratio (h/w) of gasket height (h) to line width (w) of the surface in contact with the cover body is at least 0.5 in every portion of the gasket.

3. The process according to claim 1, wherein the cross section shape of an extrusion port for a three dimensional automatic coating control apparatus is made into a quadrangle or triangle or semiellipse in which the minor axis forms the straight line portion; the gasket material is extruded through the straight line of the semiellipse or through one base from among four or three sides of the quadrangle or triangle, said base having a ratio (h$_0$/w$_0$) of height (h$_0$) to base (w$_0$) exceeding 0.5; extruded gasket face comes into contact with the cover body; and the ratio (h/w) of height (h) of gasket formed by curing the gasket material to line width (w) exceeds 0.5 in every portion of the gasket.

4. The process according to claim 3, wherein the cross section shape of an extrusion port for a three dimensional automatic painting control apparatus is made into a square, rectangle, trapezoid or isosceles triangle having a vertex angle of less than 90 degrees; the gasket material is extruded through one side in the square, one of short sides in the rectangle, one of parallel sides in the trapezoid, or the base in the isosceles triangle; and extruded gasket face comes into contact with the cover body.

5. The process according to claim 1, wherein said activation energy rays irradiated from the activation energy rays irradiation apparatus are interlocked with the motion of an extrusion port for a three dimensional automatic painting control apparatus.

6. The process according to claim 1, wherein said activation energy rays are ultraviolet rays.

7. A gasket which is intended for a hard disc drive device, which is produced by the production process as set forth in claim 1, and which is used in a hard disc device of 3.5 inches (88.9 mm) in size at the largest.

8. The process according to claim 1, wherein the cross section shape of an extrusion port for a three dimensional automatic coating control apparatus is made into an ellipse in which the minor axis forms the straight line portion; the gasket material is extruded through the straight line of the ellipse.

9. The process according to claim 8, wherein the gasket material is extruded so that the minor axis of the ellipse becomes parallel with the face of the cover.

10. The process according to claim 8, where said activation energy rays irradiated from the activation energy rays irradiation apparatus are interlocked with the motion of an extrusion port for a three dimensional automatic painting control apparatus.

11. The process according to claim 8, wherein said activation energy rays are ultraviolet rays.

* * * * *